Patented Mar. 9, 1937

2,073,021

UNITED STATES PATENT OFFICE 2,073,021

GERMICIDAL COMPOSITIONS

Raymond C. McQuiston, West Newton, Mass., assignor of twenty-five per cent to Errold B. Thomas, Newton, Mass., and twenty-five per cent to Calvin B. Smith, Boston, Mass.

No Drawing. Application June 20, 1933, Serial No. 676,765. Renewed December 14, 1934

4 Claims. (Cl. 167—70)

This invention relates to improved germicidal compositions and more particularly to improved stable aqueous solutions of iodine, and also to novel forms of iodine compounds.

The outstanding efficacy of tincture of iodine as a disinfectant and antiseptic has long been recognized. This product, however, possesses certain inherent disadvantages, such as its irritating effect on the skin. It is likewise generally known that when supplied in sufficient concentration iodine tincture may cause a burn. In addition to this it is generally recognized in the profession that tincture of iodine does present a certain tissue toxicity.

If an iodine preparation could be made which at the one time would present the germicidal efficacy of the well known tincture, while avoiding or eliminating the pronounced irritating effect and the growth inhibiting action, it would be an eminently desirable product.

The ordinary tincture of iodine which appears on the market comprises a solution of iodine in ethyl alcohol. As at present manufactured such tincture contains small amounts of potassium iodide which are added to stabilize the tincture and to some degree minimize volatilization. In spite of the proven pharmacological value of iodine, the tendency of the public in recent years has been to resort to other less effective forms of antiseptics which do not sting or burn.

This tendency has been recognized and there have been many proposals to produce a non-irritating iodine preparation. As a type these may be considered to comprehend an aqueous solution of free iodine in the solvent which is itself an aqueous solution of an iodine salt, such as potassium or calcium iodide.

Many of these forms of aqueous iodine solutions are, similarly to the tincture, irritating to skin tissue, hence their use for oral antiseptics and on delicate membranes is seriously restricted. One phase of the present invention is to produce a new non-alcoholic iodine preparation which is markedly less irritating to the skin than the ordinary tincture and which has a germicidal or bactericidal efficiency comparable to the ordinary tincture of iodine and prior aqueous iodine solutions.

A second phase of the invention is to produce stable compounds of iodine and particularly iodides of heavy metals. These compounds present peculiar and advantageous properties which render them widely useful. In the preferred form of the invention one of the new compounds of iodine is utilized as a component in the improved aqueous iodine solution, it having been found to function very beneficially in this preparation. The material, however, ramifies in its use considerably wider than the pharmacological art, as will appear more fully hereinafter.

An object of the present invention, therefore, is to produce a novel iodine base preparation characterized by marked germicidal and fungicidal properties.

Another object of the invention is to provide as a new pharmaceutical preparation a substantially non-irritant aqueous iodine solution.

A further object is to improve the efficacy of iodine when used for bactericidal purposes.

Yet another object is to produce a novel, stable, chemical system containing iodine and susceptible of high aqueous dilutions.

A still further object is to provide a stable solution of ferric iodide.

Another object is to devise a novel method of stabilizing ferric iodide.

An additional object is to provide a water iodine system in which the iodine is effectively peptized and stabilized for utilization in aqueous and/or oleaginous or other anhydrous systems.

A still further object is to produce a novel stable chemical system containing iodine and a metal iodide useful generally in the chemical arts.

With these and other equally important objects in view the invention resides fundamentally in the discovery of a novel iodine combination and its method of preparation, and further in the utilization of this in conjunction with free iodine to produce an aqueous and/or oleaginous or other anhydrous iodine system, in which the iodine is effectively peptized and stabilized, possessing striking efficacy as a pharmaceutical preparation.

In order to clearly explain the invention a preferred method of preparation of the new materials will be given, that is to say the new composition of matter involving iodine in a novel, stable, chemical system. As will be appreciated from a consideration of the physical and chemical characteristics of this new composition of matter, the potential field of use of the new material ramifies very broadly, hence such indications of use as are given are to be considered purely illustrative and exemplary and not restrictive or exclusive.

A relatively large number of different specific metal iodides are known and have been largely used. Important among these are the alkali metal iodides and ferrous iodide. The alkali metal iodides are now employed in the preparation of aqueous solutions of iodine for antiseptics and disinfectants. These solutions comprise usually a given amount of free iodine in water which is solubilized by sodium, potassium, or calcium iodide or mixtures of these so chosen as to produce an isotonic solution. In such preparation the solution of the metal iodide in water actually constitutes the solvent for the iodine.

Such solutions when employed as disinfectants or antiseptics do possess some advantages and as a matter of fact possibly some advantages over tincture of iodine. Nevertheless these products are quite irritating in character. A chemical system containing stabilized ferric iodide, and particularly a chemical system of high aqueous dilution containing ferric iodide, constitutes a new composition of matter.

Preparations of heavy metal iodides, such as iron iodides, have not been used for this purpose. Ferrous iodide ($FeI_2$) is known and has been used in medicine. This is a green crystalline deliquescent mass and is employed in the form of a syrup, indicated as a tonic alterative and useful in anaemia. A similar syrup of manganese iodide is also employed in medicine.

As a result of extensive experimentation I have found that elemental iron and elemental iodine can be directly compounded to form ferric iodide ($FeI_3$). Ferric iodide is a new compound. While this novel system containing stable ferric iodide does possess characteristics which render it generally useful in the arts, I have found that it possesses a striking and peculiar efficacy when employed with iodine for the purpose of producing aqueous and/or oleaginous and other types of anhydrous iodine solutions. One of the major advantages of this material when employed with iodine is the fact that it is possible, when it is properly compounded or correlated with iodine, to produce aqueous and/or oleaginous and other types of anhydrous solutions having a high concentration of iodine and which furthermore may be highly diluted without disturbing or destroying the stability of the system. For example, it is possible under the present invention to prepare aqueous solutions of iodine containing as much as 20–25% free iodine, which solution can be very highly diluted without precipitation or any other deleterious effect. When employed as a bactericide or germicide the new preparation presents very striking efficiency, as will be seen more fully hereinafter.

In order to explain the underlying principles of the invention typical methods of preparation of the new metal salt of iodine and its incorporation in an iodine water and/or oleaginous and other types of anhydrous systems will be described. According to the preferred method elemental iron and elemental iodine in predetermined quantities are directly electro-chemically combined. In the preferred method the two materials are triturated with a certain quantity of water under maintained temperature control. In these circumstances it is found that the iron and iodine combine to form ferric iodide. More specifically considered the process may comprise treating cheap iron filings, such as accumulated in a machine shop, so as to remove their cutting oil. This may readily be done by washing with such solvents as alcohol, carbon tetra-chloride and the like. If necessary, oxides present may be dissolved by treatment in an acid pickle bath, such as 5% sulphuric acid bath. Of course elemental iron from any source may be employed. The source illustrated is merely given to indicate the possibilities of cheap starting material. Elemental clean iron, together with elemental iodine, are compounded or combined, preferably in a colloid mill. This mill is provided with a thermal jacket or any other means whereby accurate temperature control may be achieved. In the preferred operation the temperature of the material undergoing the reaction is preferably maintained below 120° F., although higher temperature may be employed. In these circumstances, that is to say by triturating elemental iron and elemental iodine in the presence of water, use of the electro-chemical activity of the mass is resorted to for direct union of the ions of the two elements. In lieu of the typical colloid mill any wet grinding process may be utilized to institute the electro-chemical activity. Thus structures of the hammer mill or ball mill type may be employed.

I have found as a result of considerable experimentation that in these circumstances when iron in finely divided form is triturated with iodine in the presence of water and when the iron content in the reaction mixture is below 16% of the weight of the iodine employed, the two elements directly combine to form ferric iodide. In the preferred operation not over approximately 60% and not less than 10% of water in the combined mix should be employed. Operations have been conducted in which 7 parts by weight of clean iron filings have been triturated with 83 parts by weight of iodine in 10 parts of water. Under these circumstances the resulting product contains appreciable quantities of ferric iodide and free iodine and may be highly diluted with water without however precipitating the iodine or causing material conversion of the ferric to ferrous iodide. This potentiality or susceptibility of the new system to high dilutions without affecting the stability of the ferric iodide is a strikingly novel and unprecedented characteristic, for it has been generally thought heretofore that, under such circumstances of high dilution for a protracted period of time, the ferric iodide was converted to the ferrous form.

Qualitative tests have definitely proved the existence of the ferric rather than the ferrous salt when the quantities of materials employed are within the limits stated. When, however, in the same circumstances the iron content is increased above approximately 16% on the weight of the iodine, the ferrous rather than the ferric salt is produced. In qualitatively establishing the presence of ferric iodide the product was treated with sodium hydroxide. Upon such addition a brick red precipitate formed which was crystalline on drying. This established the presence of the ferric ion in the combination. Conversely, when an iron in excess of 25%, on the weight of the iodine, was combined in the colloid mill with iodine and the resultant product was treated with hydroxide, a precipitate was formed which, upon drying, developed a green crystalline mass which, as is known, constitutes ferrous iodide. Other specific tests likewise definitely established the presence of the ferric iodide in the system, even after the composition had been highly diluted and retained in such diluted state for a protracted period of time.

While for production purposes and other reasons I prefer to carry out the operation in a colloid or similar mill, it is to be distinctly understood that the process is not limited to this treatment for I have found that the ferric iodide may be produced in an open container. In these circumstances the elemental iron and elemental iodine are combined, below 180° F., and preferably between 160° and 180° F. in the presence of water when the materials are contacted in an open vessel and with agitation. I have found that in the colloidal preparation the speed of reaction appears to be proportional to the subdivision of the particle size rather than the speed of the rotor. Similarly, in the open process I have found that the reaction may be speeded up somewhat by subjecting the starting materials to preliminary grinding to reduce the particle size.

While, as noted above, any type of grinding or triturating apparatus may be employed, it is desirable in all such apparatus to utilize either stone or non-reactive metals for the grinding parts of the machine, that is to say for those sections of the machine which come in contact with the reaction mass.

It is particularly to be noted that operating according to the present process aqueous iodine solutions may be prepared in which a quantity of free iodine is obtained which is very striking, and is in such a stabilized condition that it may be greatly diluted without causing precipitation of the iodine.

In operating under the open process improved results are secured by varying somewhat the proportions of the reaction ingredients. Thus a typical method of carrying out the manufacture of this product utilizing an open container comprises contacting 10 parts by weight of finely divided elemental iron with 95 parts by weight of free iodine and in the presence of approximately 50 parts by weight of water. The mass is preferably agitated and maintained at a temperature below 180° F. Under these circumstances a quantity of the excess iodine combines with the iron to form ferric iodide and the resulting solution contains ferric iodide and free peptized or stabilized iodine susceptible of high dilutions without precipitation of free iodine or without decomposition of ferric to ferrous salts.

As noted above the product produced by this treatment comprises an aqueous iodine-ferric iodide system which contains a very large amount of free iodine. This solution presents striking and unobvious properties as noted above. When diluted down to one-thousandth of one percent of free iodine such a solution gives an acid reaction. The reduced stinging and non-burning qualities will permit of more liberal and frequent applications than other iodine compounds heretofore known, which is of great importance in expediting treatment. In a broad sense the peculiar efficacy of this new material with respect to the older products may possibly be due to an isoelectric tolerance or compatibility with both human and plant tissues heretofore unknown.

The improved characteristics of this material are no doubt due to definite physiochemical factors. While making no definite statement as to the mechanism of the chemical reaction or the mechanism of the physiological reaction, it would appear that the marked stability, permanence and low volatility of this new product is explicable by conceiving that in the system molecular iodine in very finely divided form is dispersed or peptized by the ferric iodide. This conception of the iodine-ferric iodide system would appear to be substantiated, or at least rendered plausible, by the fact that the improved product presents improved penetration and wettability. Upon the hypothesis that the ferric iodide peptizes the elemental iodine a lowering of the interfacial tension is expectable, consonant with the generally accepted physio-chemical theories; a low vapor pressure results, very probably due to the fact that the ferric iodide absorbs the free iodine. It is to be particularly observed, however, that there is a possibility that free iodine is actually present in the soluble form, being solubilized by the ferric iodide. It may well be that the two conditions obtain simultaneously, that is to say a state of true solubility and a state of colloidal suspension, the amounts within each system depending upon the quantity of iron utilized in the original preparation. In other words it may well be that in the case of a very low iron content, the electro-chemical activity is productive of spontaneous union of iron with iodine and is effected with simultaneous dispersion and peptization of the free colloidal iodine particles.

While the production of an improved product has been described with respect to definite quantities of starting materials, it is to be clearly understood that it is not limited to these proportions or actual temperature conditions. For example, experiments already completed have indicated that improved toxicity as a fungicide is obtained when approximately 8 to 9% of metallic elemental iron, on the weight of the iodine, is employed in compounding the product. In this particular instance the higher toxicity may be explained by the greater absorption value created isoelectrically with the ferric iodide. Where the free iodine is absorbed or adsorbed and no colloidal particles are evident, a higher penetration is naturally obtained. The high penetration of the new product is probably due to the ability of the ferric ion in attaching itself to or diffusing protein substances, such as skin and plant tissue.

The striking efficacy of the new composition when employed in pharmaceutical fields is indicated by the following test. Test No. 1, as will be appreciated, is the standard test (F. D. A. Bulletin No. 198) for determining the phenol coefficient. The material employed in this test was the composition such as described herein and contained 4.8% of iodine. For purposes of comparison it is to be noted that under the conditions of the test given below the phenol coefficient of a 7% tincture of iodine is 19.2. The phenol coefficient of the present product, as compared to the ordinary tincture, is therefore striking.

*Test No. I*

Name_____ "Iodine" #1
Temperature of medication_____ 20° C.
Culture used, *Staphylococcus aureus*_____ 24 hr. broth
Proportion of culture and disinfectant_____ 0.5 cc. + 5 cc.
Subculture media_____ Standard broth The method as used in these experiments was the standard F. D. A. method as described in the U. S. D. A. Bulletin No. 198.

| Sample | Dilution | Time culture exposed to action of disinfectants in minutes | | |
|---|---|---|---|---|
| | | 5 | 10 | 15 |
| Phenol | 1:60 | − | − | − |
| | 1:65 | + | − | − |
| | 1:70 | + | + | − |
| | 1:75 | + | + | + |
| Disinfectant | 1:500 | − | − | − |
| | 1:750 | − | − | − |
| | 1:1000 | − | − | − |
| | 1:1250 | − | − | − |
| | 1:1500 | + | − | − |
| | 1:1750 | + | + | − |
| | 1:2000 | + | + | + |
| | 1:3000 | + | + | + |

$$\frac{1500}{65} = 23$$

*Staph. aureus* phenol coefficient of Sample No. 1_____ 23

In order to compare the improved material to tincture of iodine and thus determine the phenol coefficient of the tincture under the same conditions as Test No. I, the following table is given:

| Sample | Dilution | Time culture exposed to action of disinfectant in minutes | | |
|---|---|---|---|---|
| | | 5 | 10 | 15 |
| Disinfectant | 1:500 | – | – | – |
| | 1:750 | – | – | – |
| | 1:1000 | – | – | – |
| | 1:1250 | – | – | – |
| | 1:1500 | + | – | – |
| | 1:1750 | + | + | + |

$$\frac{1250}{65} = 19.2$$

Staph. aureus phenol coefficient of tincture of iodine _____ 19.2

A typical antiseptic test was conducted to determine the minimum killing time. As noted in the test, the method employed was the accepted reddish antiseptic test, as follows:

Test No. II

Method—Reddish antiseptic.
Organism—Staph. aureus (U. S. Dept. of Agriculture No. 209).
Age of culture—24 hours at 27 degrees C.
Medium—Standard reddish (F. D. A.) broth (pH 6.8).
Peptone—Armour's special.
Organic matter—None.
Temperature of medication—37 degrees C.
Dose—0.5 cc. of unfiltered culture to 5 cc. of diluted disinfectant.
Subcultures—One 4 mm. loopful to 10 cc. of broth.

The subcultures were incubated for 48 hours at 37 degrees C. with the following results:

| Sample | Time of exposure | | | | | | | | |
|---|---|---|---|---|---|---|---|---|---|
| | Seconds | | | | Minutes | | | | |
| | 10 | 15 | 20 | 30 | 45 | 1 | 2 | 3 | 4 | 5 |
| Free iodine .01% | + | + | + | + | – | – | – | – | – |
| .009% | + | + | + | + | + | + | + | + | + |

| Phenol | Minutes | | |
|---|---|---|---|
| | 5 | 10 | 15 |
| 1:80 | + | – | – |
| 1:90 | + | + | – |

In the above test the same material was employed, namely the iodine-ferric iodide solution containing 4.8% of iodine. This was the original solution diluted down to .01% and, as noted in the table, this strength will kill in one minute. It may possibly kill in forty-five seconds. This strikingly illustrates the germicidal efficiency of the new product, particularly when the relatively low iodine content is considered. The improved material therefore in the dilution noted has the same antiseptic value in respect of minimum killing time as a 7% iodine tincture in dilutions of approximately 1 to 400, having a free iodine content of .0175%.

Further tests have indicated that the new product has a very improved penetration when tested under such circumstances as to indicate the penetration of body fluid and tissues. Furthermore the material evidences a very improved bacteriostatic action.

It will be observed from the above tests that this improved material is eminently efficient as a germicide. As noted hereinbefore, it possesses distinct advantages over iodine tincture, such as its greatly reduced stinging and non-burning characteristics.

It has been found as a result of experimentation that the new product possesses marked fungicidal value and is available for use in this field. In order to indicate the efficacy of its employment in this field the following results indicating its fungicidal efficacy against macrosporium and gleosporium are given:

Test No. III

| | Percent germination macrosporium | Percent germination gleosporium |
|---|---|---|
| Check | 40.0 | 82.6 |
| .0175% iodine | 22.3 | 0.0 |
| .0087% iodine | | 46.7 |
| .0044% iodine | | 90.2 |

A peculiar advantage of the improved material in this particular field is that, due probably to the dispersive properties of the ferric iodide, it may be compounded with oils, alcohol or other organic substances in aqueous and/or anhydrous solutions. The material is thus eminently suitable for incorporation in a fungicide spray. I have found, for example that ½% to 2% of the new product, based on the weight of the oil or other dispersed phase, provides a very marked peptizing action.

Additional tests have indicated that the new product is more efficient than tincture of iodine as a germicide, when tested in the same dilutions and in the same circumstances. Ferric and other heavy metal iodides alone or in combination with free iodine may be likewise employed to stabilize the commonly known tincture of iodine.

It will be observed from this that the present material is an excellent antiseptic. It is generally recognized in the profession that tincture of iodine is perhaps the best germicide known. While having a high killing power the tincture nevertheless is relatively lacking in penetrating power. In many circumstances it does not attain a sufficient depth of penetration to reach deeply seated spores. It is also generally recognized that in respect of penetration the aqueous solutions of iodine, such as a solution of iodine in potassium iodide, have greater penetrability than the tincture. Such old aqueous solutions of iodine, however, were not as effective germicides as the tincture. The new product, on the other hand, is characterized by the very high degree of penetration and, as pointed out, a germicidal power comparable to the tincture. In addition to these factors its reduced stinging qualities render it a much more desirable product to employ, particularly on tender tissue, such as the oral cavity and on wounds. In short the material combines in the optimum degree the characteristics of an ideal antiseptic.

It is particularly to be observed that while an aqueous system of iodine and ferric iodide has been described, the invention manifestly comprehends all compositions in which adjuvants are incorporated with the novel composition. Thus it may be combined with other salts to make up substantially isotonic solutions to be used as antiseptic or profusion media. Again this system may be compounded, particularly when lower percentages of iron are used, with Irish moss, gelatin, gum arabic, or other protective colloids or peptizing agents.

Similarly, while a composition including ferric iodide and iodine has been disclosed, it will be readily appreciated that the invention is not limited to the ferric salt but comprehends other heavy metal salts in the high valence state which are obtainable under the novel principles of the present disclosure.

As indicated, an obvious field of use of the present invention is as a germicide. However, it is distinctly to be understood that the physiochemical characteristics of the new product make it particularly efficacious when employed in other arts. The peptizing or protective action may be utilized in the broad field of emulsification for, as indicated hereinbefore, relatively minor amounts of this material effectively peptize or stabilize dispersed phases of vegetable and mineral oils.

The peculiar inherent characteristics of this new product make possible the application of iodine and/or heavy metal iodides in fields heretofore not possible of exploitation. Thus the product may be employed in animal and human diets. With particular reference to animal diets, while this has already been attempted, particularly with the known aqueous solution of iodine, the results have not been particularly promising. This probably is due to the precipitation of free unavailable iodine in the presence of acid constituents, such as amino acids, in the digestive tract. A rather striking feature of the new material is that it is compatible with acid and indeed, as pointed out, it is slightly acidic in character. Hence in an amino acid environment it is not precipitated as was the case in the former product.

What has been said of the compatibility of ferric or other heavy metal iodides with animal feed will, it will be appreciated, apply generally where this substance is employed with any products involving proteolytic conversion or potentially proteolytic conversion, or in any mixture where the compatibility of the substance with eventually formed amino acids, peptones and the like is of importance.

The availability of this product for compounding with other pharmaceutical material will be recognized. For example, the material may be employed, when compounded with a suitable abrasive, as a tooth paste. Again it may be compounded with a suitable oleaginous vehicle to form a cosmetic. It will be appreciated that in this use, that is when it is homogeneously incorporated with some suitable base, the antiseptic value is supplemented by the natural astringency of the material.

In some of the germicidal or fungicidal fields the present product may be associated with other products which serve as wetting agents to lower the surface tension and thus increase the wettability and spreading characteristics of the product.

This material, when sufficiently concentrated in free iodine content, is particularly effective in coagulating proteins. Hence it becomes immediately available in any and all industries utilizing this phenomena, of which the tanning industry is a classical but not exclusive example. Similarly the material may be utilized in the finishing of rubber.

The use of this material in the photographic industry will be self evident when it is noted that silver iodide can be dissolved and/or dispersed in the improved compound. Thus ferric iodide will combine with silver nitrate to form (in situ) silver iodide and ferric nitrate.

The new composition may be employed as a starting material in organic synthesis, such for example as in the synthesis of saturated and unsaturated hydrocarbons, in place of bromides and other halogens.

Thus it will be seen that while a preferred process of preparing a specific compound has been described and the value of this compound in several fields of use pointed out, these disclosures are given to exemplify the characteristics of the new compound. This compound, and particularly in combination with other materials, presents a wide potential field of use. In addition to the uses described the material may be employed in any circumstance where similar chemical factors are involved or comparable results sought. The invention, therefore, is considered to reside not only in the new germicide described but also broadly in the new type of compound. Hence these disclosures are to be considered as explanations and not as restrictions of the invention, and the invention is considered not to be restricted beyond the clear limits imposed by the appended claims.

I claim:

1. That method of producing germicidal agents which comprises triturating elemental iron and an excess of elemental iodine in an aqueous vehicle while maintaining the temperature below 180° F.

2. An antiseptic composition possessing germicidal and fungicidal properties and characterized by a minimized burning or stinging action on tissues, as compared with iodine tincture, said composition comprising a stable, permanent aqueous system including free iodine and ferric iodide, in the ratio of substantially one part of iron to ten parts of iodine, the composition being further characterized by a high dilutibility without destroying the stability of the iodine-ferric iodide equilibrium existing in the system.

3. A germicidal concentrate adapted to be highly diluted with water which comprises an aqueous vehicle containing free iodine and ferric iodide and being substantially free from ferrous iodide, the concentrate containing more iodine in the combined than in the free form.

4. A composition of matter having germicidal properties including essentially free iodine peptized by ferric iodide, the ferric iodide being in sufficient amount to stabilize the system.

RAYMOND C. McQUISTON.